No. 12,537. REISSUED OCT. 9, 1906.

F. I. GETTY.

STRAINER FOR OIL AND WATER WELLS.

APPLICATION FILED AUG. 31, 1906.

Witnesses:
John Enders.
Chas. H. Duell.

Inventor:
Fred I. Getty,
By Dyrenforth, Dyrenforth, Lee & Wiles
Attys.

UNITED STATES PATENT OFFICE.

FRED I. GETTY, OF JENNINGS, LOUISIANA.

STRAINER FOR OIL AND WATER WELLS.

No. 12,537. Specification of Reissued Letters Patent. Reissued Oct. 9, 1906.

Original No. 787,913, dated April 25, 1905. Application for reissue filed August 31, 1906. Serial No. 332,876.

*To all whom it may concern:*

Be it known that I, FRED I. GETTY, a citizen of the United States, residing at Jennings, in the parish of Calcasieu and State of Louisiana, have invented a new and useful Improvement in Strainers for Oil or Water Wells, of which the following is a specification.

My invention relates to certain new and useful improvements in strainers for oil and water wells; and its object is to produce a device of this class which shall have certain advantages, which will appear more fully and at large in the course of this specification.

To this end my invention consists in certain novel features, which are shown in the accompanying drawings as embodied in my preferred form of construction.

Figure 1:
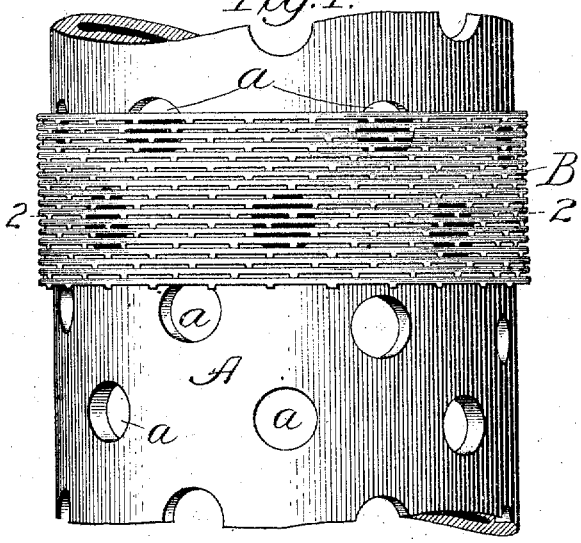
Figure 3:
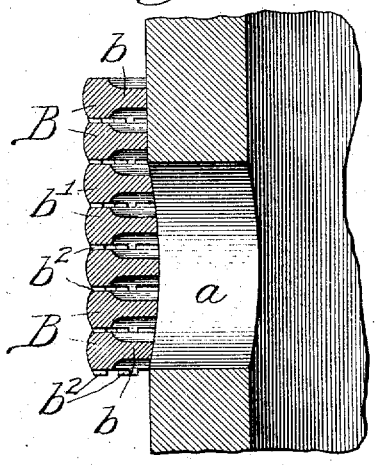
Figure 4:
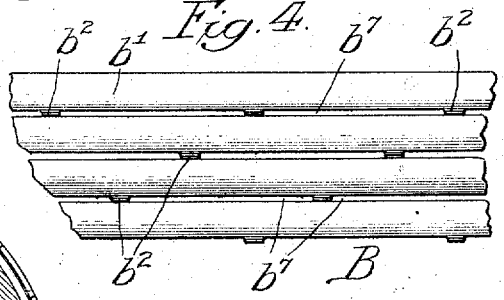
Figure 2:
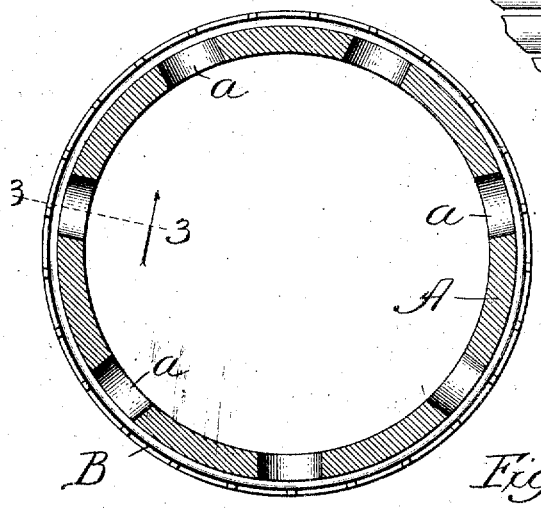
Figure 7:
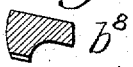
Figure 5:
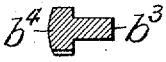
Figure 6:
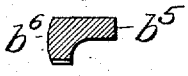
Figure 8:
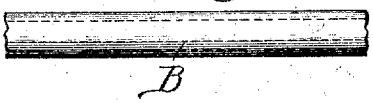
Figure 9:
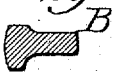

In the aforesaid drawings, Figure 1 is an elevation of my strainer. Fig. 2 is a transverse section in line 2 2 of Fig. 1. Fig. 3 is an enlarged detail section in line 3 3 of Fig. 2. Fig. 4 is an elevation of a number of lengths of wire, showing the arrangement thereof in my device. Fig. 5 is a section through a modified form of wire. Fig. 6 is a section through a second modified form of wire. Fig. 7 is a section through a third modified form of wire. Fig. 8 is an elevation of a fragment of wire, showing the same before its completed condition; and Fig. 9 is a cross-section of the same.

Referring to the drawings, A is a suitable pipe having a plurality of perforations *a*. About the pipe A is wound a wire B. This wire, it will be seen, has a flat or horizontal web *b* when viewed in cross-section, the said web lying at right angles to the axis of the pipe, and an enlarged outer portion or vertical web $b'$, so that the preferred form of construction of wire is roughly T-shaped in cross-section, the head of the T lying parallel to the surface of the pipe. The horizontal web *b* is made as narrow as is consistent with the proper strength, so as to provide a comparatively large passage-way in order that the fluid may run freely in said passage-way to the nearest perforation in the pipe.

The vertical web $b'$ is provided on one edge with a plurality of projecting lugs $b^2$, which contact with the opposite side of the vertical web of the next succeeding turn of the wire, thereby spacing the turns apart. It will be seen that the adjacent faces of the vertical webs $b'$ are parallel, so as to leave said webs free from any acute angles. By this construction the edges are not apt to be so rapidly worn away by the passage of very fine sand, as would be the case were the edges made with acute angles. The outer surface of the said vertical web is convex, as shown, instead of flat. This form is advantageous in that the middle portion of the convex surface projects outward farther than the edges, and thereby protects the mouths of the openings through which the fluid passes from injury by contact with the rocky surface of the sides of the well when the strainer is let down into place.

In the modified form of wire shown in Fig. 5 the horizontal web $b^3$ and vertical web $b^4$ meet at a sharp angle, without the curve shown in the preferred form, and in the modified form shown in Fig. 6 the cross-section is L-shaped instead of T-shaped, the horizontal web $b^5$ meeting the vertical web $b^6$ at one side instead of in the middle.

The modified form of wire shown in Fig. 7 in cross-section is like that shown in Fig. 6, except that the horizontal web $b^8$ is not at right angles with the vertical web. This form brings the end of the horizontal web which contacts with the perforated pipe more nearly opposite the center of the vertical web than that shown in Fig. 6.

By the term "horizontal web" I refer to a web having approximately parallel sides and extending inward from the vertical web to the face of the pipe.

My improved construction is particularly advantageous where a large flow is desired, for the reason that the comparatively narrow horizontal webs give a large arch-shaped space inside the vertical webs, in which space the liquid can flow to the nearest perforation in the pipe. The device possesses a further feature of advantage in that the depressions $b^7$ can be formed on the vertical web by rolling the wire between rolls, one of which has longitudinal grooves in its convex surface, in which the lugs are left. In this way extreme accuracy of mesh is obtained without interfering with the freedom of the flow above set forth.

I realize that considerable variation is possible in the details of this construction without departing from the spirit of my invention, and I do not, therefore, intend to limit myself to the specific form herein shown and described.

I claim as new and desire to secure by Letters Patent—

1. In a device of the class described, the combination, with a perforated pipe, of a wire spirally wound upon the same, said wire having a horizontal web in contact with the surface of the pipe, a vertical web outside the horizontal web overhanging to form arch-shaped spaces between the turns of wire, and suitable lugs which contact with the next adjacent turn to space the wire apart.

2. In a device of the class described, the combination with a perforated pipe, of a wire spirally wound upon the same, said wire being T-shaped in cross-section, one web of the wire being in contact with the pipe, and the other web overhanging the spaces between the two adjacent turns of wire to form arch-shaped spaces, and having lugs which space the turns apart.

3. In a device of the class described, the combination with a perforated pipe, of a wire spirally wound upon the same, said wire having a horizontal web in contact with the surface of the pipe, a vertical web having a convex outer face, said vertical web being outside and overhanging the horizontal web so as to form arch-shaped spaces between the turns of wire and a series of depressions separated by lugs whose faces contact with the adjacent coil; substantially as, and for the purpose stated.

4. In a device of the class described, the combination with a perforated pipe, of a wire spirally wound upon the same, said wire having a horizontal web in contact with the surface of the pipe, a vertical web outside of and overhanging the horizontal web, said vertical web having two faces which are approximately at right angles to the axis of the perforated pipe, said faces forming the sides of the openings through which the fluid passes on entering the strainer to the passsage-way inside and between the coils, and a series of depressions separated by lugs; substantially as described.

5. In a device of the class described, the combination with a perforated pipe, of a wire spirally wound upon the same, said wire having a horizontal web in contact with the surface of said pipe whose sides are parallel with each other, a vertical web outside of and overhanging the horizontal web, said vertical web having two faces which are approximately at right angles to the axis of the perforated pipe, said faces forming the sides of the openings through which the fluid passes, on entering the strainer, to the passage-way inside and below the coils and a series of depressions separated by lugs; substantially as described.

6. In a device of the class described, the combination with a supporting device, of a wire spirally wound upon the same, said wire having a horizontal web in contact with the surface of the supporting device, a vertical web outside the horizontal web overhanging to form arch-shaped spaces between the turns of wire, and suitable means for holding the turns in proper position.

7. In a device of the class described, the combination with a perforated pipe, of a wire spirally wound upon the same, said wire having a horizontal web in contact with the surface of the pipe, a vertical web outside of the horizontal web overhanging to form arch-shaped spaces between the turns of wire, and suitable means for holding the turns in proper position.

8. In a device of the class described, the combination with a perforated pipe, of a wire spirally wound upon the same, said wire being T-shaped in cross-section, one web of the wire being in contact with the pipe, and the other web overhanging the spaces between the two adjacent turns of wire to form arch-shaped spaces, and means for holding the turns in proper position.

FRED I. GETTY.

In presence of—
S. E. HEMPSTEAD,
V. ROMERO.